United States Patent
Fang et al.

(10) Patent No.: US 6,714,001 B2
(45) Date of Patent: Mar. 30, 2004

(54) DISPATCHING METHOD OF MANUFACTURING INTEGRATED CIRCUIT

(75) Inventors: Henry Fang, Hsinchu (TW); Chung-Hsin Chen, Hsinchu (TW)

(73) Assignee: Winbond Electronics Corporation, Hsinchu (TW)

( * ) Notice: Subject to any disclaimer, the term of this patent is extended or adjusted under 35 U.S.C. 154(b) by 293 days.

(21) Appl. No.: 09/994,764

(22) Filed: Nov. 28, 2001

(65) Prior Publication Data

US 2003/0100131 A1 May 29, 2003

(51) Int. Cl.⁷ .................................................. G01R 3/42
(52) U.S. Cl. ...................................... 324/158.1; 438/15
(58) Field of Search ...................... 4414/22.01; 438/15; 198/341.07; 700/228, 113; 324/158.1

(56) References Cited

U.S. PATENT DOCUMENTS

| | | | | |
|---|---|---|---|---|
| 5,955,877 A | * | 9/1999 | Farnworth et al. | 324/158.1 |
| 6,076,652 A | * | 6/2000 | Head, III | 198/341.07 |
| 6,427,096 B1 | * | 7/2002 | Lewis et al. | 700/228 |
| 6,467,505 B1 | * | 10/2002 | Thordarson et al. | 137/613 |
| 6,492,187 B1 | * | 12/2002 | Farnworth et al. | 438/15 |
| 6,579,052 B1 | * | 6/2003 | Bonora et al. | 414/222.01 |

* cited by examiner

Primary Examiner—John Niebling
Assistant Examiner—Andre' Stevenson

(57) ABSTRACT

A dispatching method of manufacturing integrated circuit (IC) by push and pull two-way is to decide the dispatching orders of lots of wafers in each workstation. First, the priorities of lots of wafers is determined, and then the dispatching method of manufacturing IC by push and pull two-way is proceeded to run several push steps and pull steps. The push step is to dispatch wafers directly from upper process, no matter the lower units are crowded or delayed. On the other hand, the pull step is first to concern deficiencies in the lower unit, and then to dispatch wafers from the upper units. After proceeding the push steps and the pull steps, the other lots of wafers are dispatched by their original priorities. The dispatching method of manufacturing IC by push and pull two-way has the advantage of increasing the utilities of equipments.

29 Claims, 4 Drawing Sheets

DISPATCHING METHOD OF MANUFACTURING INTEGRATED CIRCUIT

FIELD OF THE INVENTION

The present invention relates to a dispatching method of manufacturing integrated circuit (IC), and more particularly, to a dispatching method by push and pull two-way in accordance with the needs of each workstation.

BACKGROUND OF THE INVENTION

As the semiconductor processes develop to use very large scale integration (VLSI) technology, all the IC processes become more complex and difficult. Hundreds of steps are needed to manufacture IC chips with high integration, and a lot of wafers are manufactured by using numerous different workstations that may reuse the apparatuses of the same type, and lots of wafers are manufactured by using the workstation with the same type of apparatuses. Thus, the complexity of dispatching is increased for such inextricable processes. For the semiconductor industries, due to the limited resources of the IC factory, it is the most important to map out the optimal dispatching principles so as to form the production line with high efficiency. Unsuitable dispatching principles frequently delay the process cycle time, and even reduce the utility of the apparatuses, and hence the custom satisfaction is reduced due to decrease of the flexible cycle life of products. With regarding to topic discussed above, semiconductor industries usually can increase outputs and achievements of apparatuses by improving dispatching principles, and cut down the waiting time of lots of wafers in production lines simultaneously, wherein properly determining the priorities of lots of wafers can decrease the cycle time of processes, and increase utilities of equipments, and deliver the goods on time.

FIG. 1 illustrates the general dispatching method of manufacturing IC. Referring to FIG. 1, in IC factories, after obtaining the data of work in processes (WIP) 10 in equipments, priorities of lots of wafers are determined by respective parameters and method 12, such as the delivery time and production of equipments, etc., and lots of wafers are dispatched by each of the priorities 14, and then the dispatching procedures of equipments are finished accordingly.

SUMMARY OF THE INVENTION

In consideration of increasing outputs and achievements of apparatuses, and cutting down the waiting time of lots of wafers in production lines, the aspect of the present invention is to provide a preferred dispatching method of lots of wafers.

Referring to the aforementioned aspect, when lots of wafers with priorities is manufactured in processes by a plurality of apparatuses, the two-way dispatching method of the present invention decides the orders of lots of wafers manufactured in processes, wherein the processes are composed of a plurality of stages, and the stages are composed of a plurality of workstations. The two-way dispatching method of manufacturing IC of the present invention includes: performing a first push step to dispatch first lots of wafers with a compulsory order to each workstation; calculating capacity of each of the equipments, and then gathering a plurality of first deficiencies of equipments; performing a first pull step, if an amount of lots of wafers is less than a full load manufactured in a first stage and has a first vacancy, then dispatching a second lots of wafers into a second stage in front of the first stage, wherein the second lots of wafers have same amount as the first vacancy; calculating capacity of each of the equipments, and then gathering a plurality of second deficiencies of equipments; performing a second pull step, if an amount of lots of wafers is less than a full load manufactured in a first workstation with a second vacancy, then dispatching a third lots of wafers into a second workstation in front of the first workstation wherein the third lots of wafers have same amount as the second vacancy, and the first and the second workstation are in the same stage; calculating capacity of each of the equipments, and then gathering a plurality of third deficiencies of equipments; performing a second push step, dispatching lots of wafers by the priority into the workstations which do not have the full load.

In the two-way dispatching method of manufacturing IC of the present invention, the lots of wafer with a compulsory order include lots of wafers with a special priority, delayed lots of wafers and idle lots of wafers so as to influence the processes of manufacturing IC. In addition, the second is next to the first stage, and the second workstation is next to the first workstation.

When the first stage is the last one of the stages, the two-way dispatching method of manufacturing IC of the present invention even includes repeating the first pull step to dispatch from the second stage to the first one of the stages in turn, thereby dispatching all stages are dispatched. Similarly, when the first workstation is the last one of the workstations, the two-way dispatching method of manufacturing IC of the present invention even include repeating the second pull step, to dispatch from the second workstation to the first one of the workstations in turn, thereby dispatching all workstations in the same stage.

Applying to dispatching method of wafers, the two-way dispatching method of manufacturing IC of the present invention even include: providing a database which has process data of lots of wafers manufactured in each of the workstations; determining priorities of lots of wafers by the process data; obtaining capacity limits of equipments; obtaining a standard amount of wafers manufactured by equipments from the capacity scheme system; calculating the deficiencies of equipments by estimating the standard amount of wafers manufactured by equipments; dispatching lots of wafers by the two-way dispatching method of manufacturing IC which estimating the priority of lots of wafers, the capacity limits of equipments and the deficiencies of equipments; printing a dispatching list of the result dispatching by the two-way dispatching method of manufacturing IC.

The two-way dispatching method of manufacturing IC of the present invention employs push and pull two-way, and is concerned with not only short-term arrangement in the IC factory, but also the balance of production line, so as to increase the utility of equipments.

BRIEF DESCRIPTION OF THE DRAWINGS

The foregoing aspects and many of the attendant advantages of this invention will become more readily appreciated as the same becomes better understood by referencing the following detailed description, when taken in conjunction with the accompanying drawings, wherein.

DETAILED DESCRIPTION OF THE PREFERRED EMBODIMENT

Figure 2:
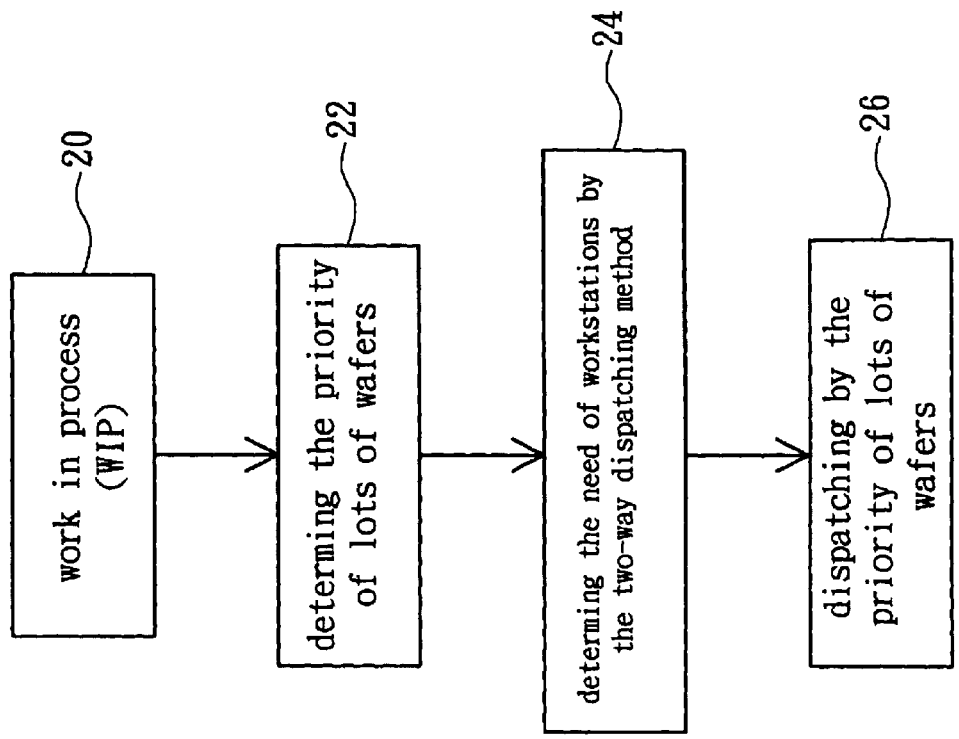
FIG. 2 illustrates the dispatching method of manufacturing IC of the present invention.
Figure 1:
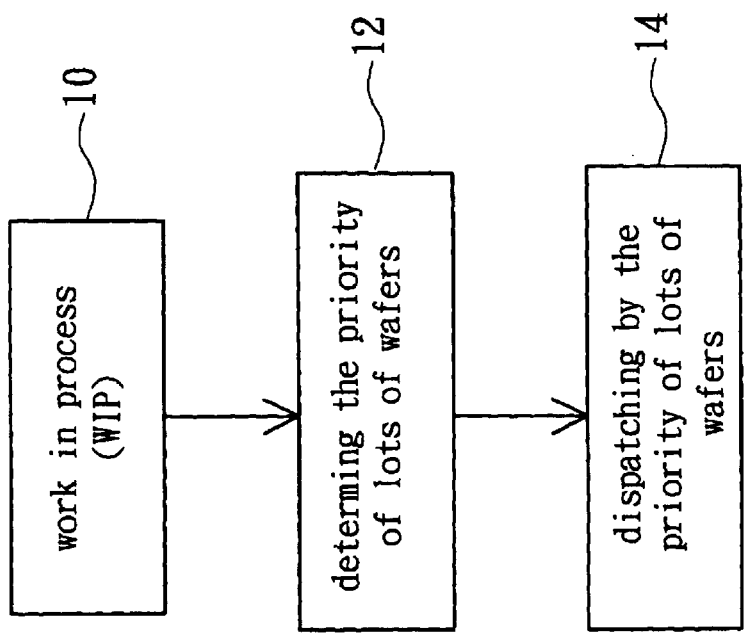
FIG. 1 illustrates the general dispatching method of manufacturing IC.

Although it takes hundreds of steps for manufacturing an IC, the waiting time of lots of wafers in the production line can be decreased by the optimal dispatching method. Therefore, the present invention provides a dispatching method of manufacturing IC to balance the production line. FIG. 2 illustrates the dispatching method of manufacturing IC of the present invention. When lots of wafers is manufactured in processes, data of WIP 20 are obtained from a database, and priorities 22 of lots of wafers are determined by prechosen parameters. The processes are composed of a plurality of workstations, and for the convenience of management, several workstations are divided into several stages. After determining priorities of lots of wafers 22, the dispatching method of wafers of the present invention determines the needs of workstations by the two-way dispatching method of manufacturing IC 24, then dispatching wafers by the priorities 26.

The step 24 is the two-way dispatching method of manufacturing IC of the present invention determining the needs of workstations. After determining the priorities of lots of wafers, the two-way dispatching method of manufacturing IC of the present invention uses push and pull step to determine the dispatching order of lots of wafers in workstations. The push step is to concern lots of wafers which need urgently manufacturing and dispatching, so that no matter how crowded or delayed are the lower units, wafers are dispatched directly from upper process, so that the lots of wafers need urgently manufacturing can be always dispatched in the first order. On the other side, the pull step is first to concern deficiencies in the lower unit, and then to dispatch wafers from the upper units, so that the utilities of equipments are increased. After the needs of equipments are determined by two-way dispatching method of the present invention, the other lots of wafers are dispatched by their priorities.

The following preferred steps of dispatching wafers to workstations by the two-way dispatching method of manufacturing IC of the present invention include:

(1) Performing a push step. WIP is judged with compulsory priority of equipment respectively, and these wafers are dispatched to the workstations first. Then, the capacities and the deficiencies of equipments are recalculated.

(2) Performing a pull step, where the deficiencies of the lower units are concerned. The vacancies of stages from the deficiencies of equipments at step (1) is calculated, and the full load of the coming stage is in order to be filled, and the lots of wafers are dispatched to a stage, which have the same amount as the vacancy of the coming stage. The pull step is performed from the last stage. If the last stage is not filled to the full load, then wafers having the same amount as the vacancy of the last stage are dispatched to the one before the last stage. After the last stage is performed with the pull step, the one before the last stage follows, and so are for the all stages. Then, the capacities and the deficiencies of equipments are recalculated.

(3) Performing a push step, where the needs of the lower units are concerned. The vacancies of workstations from the deficiencies of equipments at step (2) are calculated, and the full load of the coming workstations is in order to be filled, and the lots of wafers are dispatched to a workstation, which have the same amount as the vacancy of the coming workstation. The stages in the processes of manufacturing IC include a plurality of workstations, and at the step (2), wafers are dispatched into stages, so that, at the step (3), wafers are just dispatched into workstations. The pull step is performed from the last workstation. If the last workstation is not filled to the full load, then wafers having the same amount as the vacancy of the last workstation are dispatched to the one before the last workstation. After the last workstation is performed with the pull step, the one before the last workstation follows, and so are for the all workstations. Then, the capacities and the deficiencies of equipments are calculated.

(4) Performing a push step. The surplus of wafers is dispatched into the workstations, which is not filled with the full load, by foregoing priorities.

In the step (1) of the two-way dispatching method of manufacturing IC of the present invention, the lots of wafers with a compulsory priority include the lots of wafers with special priorities, delay lots of wafers and idle lots of wafers affecting the IC production, and they are determined by actual processes. In addition, the characteristic of the present invention is that pushing wafers into all stages composed of a plurality of workstations first, then pulling wafers into the single workstation, and at last dispatching wafers by priorities. Therefore, both with the single stage and the workstation are concerned, so as to avoid running out of WIP. The two-way dispatching method of manufacturing IC of the present invention is not limited to the aforementioned four steps, and neither to the dividing of stages and workstations. The present invention may further add push or pull steps in the dispatching method, or divide larger and smaller work units in accordance with the actual manufacturing equipments and processes of products.

Figure 3:
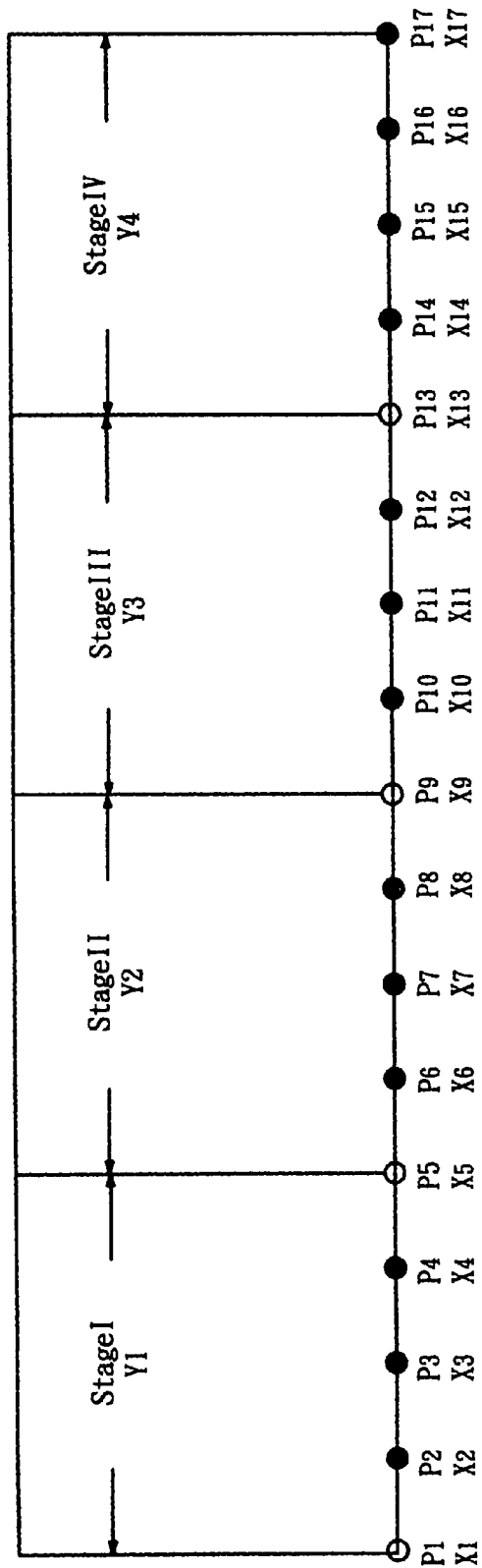
FIG. 3 illustrates the schematic diagram of IC processes of the present invention.

Following is the preferred embodiment of the two-way dispatching of manufacturing IC of the present invention. Referring to FIG. 3, FIG. 3 illustrates the schematic diagram of IC processes of the present invention. In the embodiment, all the IC processes include 17 workstations from workstation $P_1$ to workstation $P_{17}$, and wafers are manufactured with these workstations. Due to the different o products, some wafers are not processed in all stage or workstations before completely manufactured. The foregoing process has four bottleneck workstations, which are bottleneck workstation P1, bottleneck workstation P5, bottleneck workstation P9, and bottleneck workstation P13, and the present invention determines that the region of a stage is located between two bottleneck workstations. Hence, where between bottleneck workstation $P_1$ and bottleneck workstation $P_5$ is stage I, and stage I includes bottleneck workstation $P_1$, workstation $P_2$, workstation $P_3$, and workstation $P_4$; where between bottleneck workstation $P_5$ and bottleneck workstation $P_9$ is stage II, and stage II includes bottleneck workstation $P_5$, workstation $P_6$, workstation $P_7$, and workstation $P_8$; where between bottleneck workstation $P_9$ and bottleneck workstation $P_{13}$ is stage III, and stage III includes bottleneck workstation $P_9$, workstation $P_{10}$, workstation $P_{11}$, and workstation $P_{12}$; where between bottleneck workstation $P_{13}$ and bottleneck workstation $P_{17}$ is stage IV, and stage IV includes bottleneck workstation $P_{13}$, workstation $P_{14}$, workstation $P_{15}$, workstation $P_{16}$, and workstation $P_{17}$. Each workstation, including from workstation $P_1$ to workstation $P_{17}$, has a respective full load of WIP, including from full load of WIP $X_1$ to full load of WIP $X_{17}$, and each stage, including from stage I to stage II, has a respective full load of WIP, including from full load of WIP $Y_1$ to full load of WIP $Y_4$. Especially, the foregoing 17 workstations, from workstation $P_1$ to workstation $P_{17}$, are not composed of 17 equipments. As a result of the process of reusing equipments, the amount of equipments may be less than 17.

Figure 4:
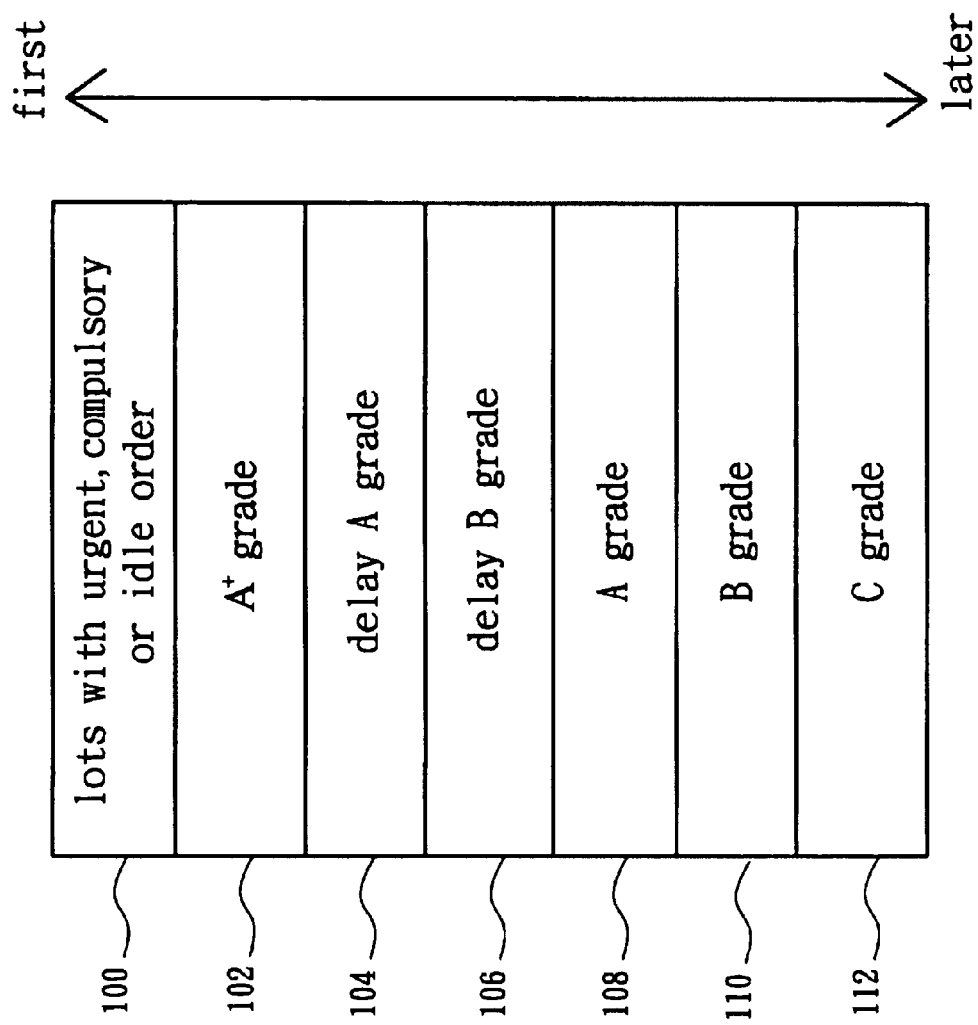
FIG. 4 illustrates the priorities of lots of wafers in the preferred embodiment of the present invention.

First, the present invention is to determine the priorities of lots of wafers, and to dispatch the lots of wafers with a compulsory order into workstations of stages. FIG. 4 illustrates the priorities of lots of wafers in the preferred embodiment of the present invention. Referring to FIG. 4, the sorting principles include general grades of lots of wafers, delay factors, idle factors, and boss instructions. The general grades f lots of wafers include A grade, B grade, and C grade of lots of wafers. The boss instructions have right to change dispatching order regardless of priorities, so that lots of wafers with special needs may be dispatched first. Therefore, lots of wafers are divided into 7 grades as shown in FIG. 4, and from the first to the end, the dispatching orders in turn are lots of wafers with urgent, compulsory or idle order 100, lots of wafers with $A^+$ grade 102, lots of wafers with A grade but delay 104, lots of wafers with B grade but delay 106, lots of wafers with A grade 108, lots of wafers with B grade 110, and lots of wafers with C grade 112.

After the wafers with a compulsory order are dispatched, wafers are dispatched into workstations by the two-way dispatching method of manufacturing IC of the present invention, including:

(1) Performing a push step. The lots of wafers with urgent, compulsory or idle order 100, lots of wafers with $A^+$ grade 102, and lots of wafers with A grade but delay 104, such as shown in FIG. 4, are dispatched to the workstations first. Then, the capacities and the deficiencies of equipments are calculated.

(2) Performing a pull step from the last one of stages, stage IV. If the stage IV is not filled to the full load $Y_4$ and has a vacancy $L_4$, then wafers having the same amount as the vacancy $L_4$ of the stage IV are dispatched to the stage III, in front of stage IV. Following, a pull step is performed from the stages III. If the stage III is not filled to the full load $Y_3$ and has a vacancy $L_3$, then wafers having the same amount as the vacancy $L_3$ of the stage III are dispatched to the stage II, in front of stage III. Following, a pull step is performed from the stages III. If the stage II is not filled to the full load $Y_2$ and has a vacancy $L_2$, then wafers having the same amount as the vacancy $L_2$ of the stage II are dispatched to the stage I, in front of stage II. After all the stages are performed with the pull step, then the capacities and the deficiencies of equipments are recalculated.

In the aforementioned pull steps, the lots of wafers, which will be processed in the next stage, are just dispatched to fill the full load of the one before the next stage. It is to say that the wafers not manufactured in a stage should not be dispatched in the one before the stage.

(3) Performing a pull step from the last one of workstations in the stage IV, workstation $P_{17}$. If the workstation $P_{17}$ is not filled to the full load $X_{17}$ and has a vacancy $W_{17}$, then wafers having the same amount as the vacancy $W_{17}$ of the workstation $P_{17}$ are dispatched to the workstation $P_{16}$, in front of workstation $P_{17}$. Following, a pull step is performed from the workstation $P_{16}$. If the workstation $P_{16}$ is not filled to the full load $X_{16}$ and has a vacancy $W_{16}$, then wafers having the same amount as the vacancy $W_{16}$ of the workstation $P_{16}$ are dispatched to the workstation $P_{15}$, in front of workstation $P_{16}$. Following, a pull step is performed from the workstation $P_{15}$. If the workstation $P_{15}$ is not filled to the full load $X_{15}$ and has a vacancy $W_{15}$, then wafers having the same amount as the vacancy $W_{15}$ of the workstation $P_{15}$ are dispatched to the workstation $P_{14}$, in front of workstation $P_{15}$. Following, a pull step is performed from the workstation $P_{14}$. If the workstation $P_{14}$ is not filled to the full load $X_{14}$ and has a vacancy $W_{14}$, then wafers having the same amount as the vacancy $W_{14}$ of the workstation $P_{14}$ are dispatched to the bottleneck workstation $P_{13}$, in front of workstation P14. After the workstations in stage IV are performed with the pull steps, the workstations in stage III, stage II, and stage I are performed with the pull steps similarly. Then, the capacities and the deficiencies of equipments are calculated.

In the aforementioned pull steps, the lots of wafers, which will be processed in the next workstation, are just dispatched to fill the full load of the one before the next workstation. It is to say that the wafers not manufactured in a workstation should not be dispatched in the one before the workstation.

(4) Performing a push step. The surplus of wafers, such as lots of wafers with B grade but delay 106, is dispatched into the workstations, which are not filled the full load.

In the step (1) of the two-way dispatching method of manufacturing IC of the present invention, the wafers with compulsory order are not limited to the lots of wafers with urgent, compulsory or idle order 100, the lots of wafers with $A^+$ grade 102, and the lots of wafers with A grade but delay 104. The present invention may determine the lots of wafers with compulsory order in accordance with the actual manufacturing process and requirements.

Referring to the foregoing preferred embodiment, the more the delay lots of wafers are, the more delay lots of wafers the present invention is to dispatch. On the other hand, when the delay lots of wafers are less, the present invention may perform the pull step (2) or the pull step (3) to resolve the problems of the deficiencies of workstations. Therefore, the two-way dispatching of manufacturing IC of the present invention has the advantages of taking both priorities of wafers and utilities of equipments into consideration.

Figure 5:
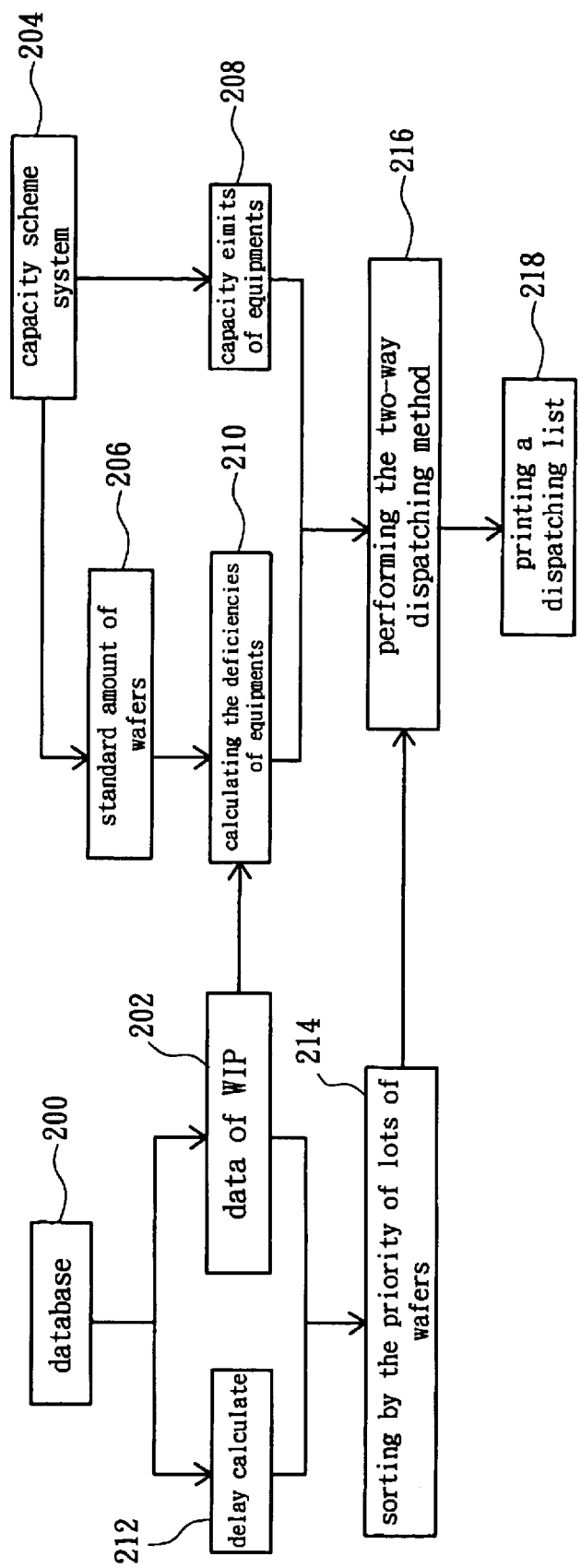
FIG. 5 illustrates the dispatching method of manufacturing IC of the present invention.

The preferred embodiment of dispatching method of wafers using the two-way dispatching method of manufacturing IC of the present invention is shown in FIG. 5. FIG. 5 illustrates the dispatching method of manufacturing IC of the present invention. Referring to FIG. 5, the present invention downloads the latest data of WIP 202 of equipments, and performs the delay calculation 212 to confirm the condition and delay time of wafers. Then, the present invention determines the priorities of lots of wafers by the data of WIP 202 and the result of delay calculation, and sorts the wafers by priorities 214. On the other hand, the present invention gathers the standard amount of wafers 206 from the capacity scheme system 206, and compares them with the data of WIP 202 in database 200, thereby calculating the deficiencies of equipments 210. Then, according to the results of sorting wafers with priorities 214 and calculating deficiencies of equipments 210, wafers are dispatched by the two-way dispatching method of manufacturing IC of the present invention 216, and restricted in the capacity limit of equipments 208 from capacity scheme system 204. Hence, the present invention gets the dispatching order of wafers, and prints a dispatching list 218 to begin the process of manufacturing IC.

The two-way dispatching method of manufacturing IC of the present invention reuses the push step and pull step. It not only concerns the short-term arrangement in the IC factory by push steps, but also the balances of production line by pull steps.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A two-way dispatching method of manufacturing IC, while a plurality of lots of wafers with a plurality of priorities are manufactured in a process by a plurality of equipments, used to determine a dispatching order in a plurality of workstations, wherein the process is composed of a plurality of stages, and the stages are composed of a plurality of workstations, the two-way dispatching method of manufacturing IC comprising:

performing a first push step, a first lot of wafers with a compulsory order is dispatched into the workstations, wherein the first lot of wafers is included in the lots of wafers;

calculating a plurality of first capacities and a plurality of first deficiencies of the equipments;

performing a first pull step, if amount of lots of wafers manufactured in a first stage of the stages is not filled to a first full load and has a first vacancy, then a second lot of wafers having the same amount as the first vacancy of the first stage is dispatched to a second stage, in front of the first stage, wherein the second lot of wafers is included in the lots of wafers;

calculating a plurality of capacities and a plurality of second deficiencies of the equipments;

performing a second pull step, if amount of lots of wafers manufactured in a first workstation of the workstations is not filled to a second full load and has a second vacancy, then a third lot of wafers having the same amount as the second vacancy of the first workstation is dispatched to a second workstation, in front of the first workstation, wherein the first workstation and the second workstation are in the same stage, and the third lot of wafers are included in the lots of wafers;

calculating a plurality of capacities and a plurality of third deficiencies of these equipments; and performing a second push step, dispatching the lots of wafers into the workstations, which is not filled the second full load.

2. The two-way dispatching method of manufacturing IC of claim 1, wherein the first lots of wafers with the compulsory order comprising: lots of wafers with a special priority, delay lots of wafers, and idle lots of wafers affecting manufacturing IC.

3. The two-way dispatching method of manufacturing IC of claim 1, wherein the second lots of wafers has the same amount of the first vacancy.

4. The two-way dispatching method of manufacturing IC of claim 1, wherein the third lots of wafers has the same amount of the second vacancy.

5. The two-way dispatching method of manufacturing IC of claim 1, wherein the second stage is next to the first stage.

6. The two-way dispatching method of manufacturing IC of claim 1 further comprising: repeating the first pull step, dispatching from the second stage to the first one of the stages.

7. The two-way dispatching method of manufacturing IC of claim 6, wherein the first stage is the last one of the stages.

8. The two-way dispatching method of manufacturing IC of claim 1, wherein the second workstation is next to the first workstation.

9. The two-way dispatching method of manufacturing IC of claim 8 further comprising: repeating the second pull step, dispatching from the second workstation of the stages to the first one of the workstation of the stages.

10. The two-way dispatching method of manufacturing IC of claim 9, wherein the first workstation is the last one of the workstation.

11. A two-way dispatching method of manufacturing IC, while a plurality of lots of wafers with a plurality of priorities are manufactured in a process by a plurality of equipments, uses to determine a dispatching order in a plurality of work units, wherein the process is composed of the work units, the two-way dispatching method of manufacturing IC comprising:

performing a first push step, a first lots of wafers with a compulsory order is dispatched into these workstation, wherein the first lot of wafers is comprised in the lots of wafers;

calculating a plurality of first capacities and a plurality of first deficiencies of these equipments;

performing a pull step, if a mount of lots of wafers manufactured in a first work unit of the work units is not filled to a first full load and has a first vacancy, then a second lot of wafers having the same amount as the first vacancy of the first work units is dispatched to a second work units, in front of the first work unit, wherein the second lot of wafers is included in the lots of wafers;

calculating a plurality of capacities and a plurality of second deficiencies of these equipments; and performing a second push step, dispatching the lots of wafers into the work units, which is not filled the second full load.

12. The two-way dispatching method of manufacturing IC of claim 11, wherein the first lot of wafers with the compulsory order comprises: lots of wafers with a special priority, delay lots of wafers, and idle lots of wafers affecting manufacturing IC.

13. The two-way dispatching method of manufacturing IC of claim 11, wherein the second lot of wafers has the same amount of the first vacancy.

14. The two-way dispatching method of manufacturing IC of claim 11, wherein the second work unit is next to the first work unit.

15. The two-way dispatching method of manufacturing IC of claim 1 further comprising: repeating the pull step; and dispatching from the second work unit to the first one of the work unit.

16. The two-way dispatching method of manufacturing IC of claim 15, wherein the first work unit is the last one of the work units.

17. A dispatching method of wafers of manufacturing IC, while a plurality of lots of wafers are manufactured in a process in a plurality of workstations of a plurality of stages by a plurality of equipments, the dispatching method of wafers of manufacturing IC comprising:

providing a database, wherein the database has a plurality of process data of the lots of wafers of the workstations;

determining a plurality of lots of wafers by using the process data;

gathering a plurality of capacity limits of the equipments from a capacity scheme system;

gathering a plurality of standard amount of wafers which can be manufactured in the equipments according to the capacity scheme system;

calculating a plurality of deficiencies of the equipments by the standard amount of wafers;

Performing the two-way dispatching method to dispatch the lots of wafers by the priorities, the capacity limits of the equipments, and the deficiencies of the equipments, the two-way dispatching method comprising:
performing a first push step;
performing a first pull step;
performing a second pull step;
performing a second push step; and
printing a dispatching list according to the result of the two-way dispatching method.

18. The dispatching method of wafers of manufacturing IC of claim 17, wherein the first push step further comprises: a first lots of wafers with a compulsory order dispatched into these workstation, wherein the first lot of wafers is included in the lots of wafers.

19. The dispatching method of wafers of manufacturing IC of claim 17, wherein the first lot of wafers with the compulsory order comprises: lots of wafers with a special priority, delay lots of wafers, and idle lots of wafers affecting manufacturing IC.

20. The dispatching method of wafers of manufacturing IC of claim 17, wherein the first pull step further comprises: if a mount of lots of wafers manufactured in a first stage of the stages is not filled to a first full load and has a first vacancy, dispatching a second lot of wafers having the same amount as the first vacancy of the first stage to a second stage, in front of the first stage, wherein the second lot of wafers comprises included in the lots of wafers.

21. The dispatching method of wafers of manufacturing IC of claim 20, wherein the second lots of wafers has the same amount as the first vacancy.

22. The dispatching method of wafers of manufacturing IC of claim 20, wherein the second stage is next to the first stage.

23. The dispatching method of wafers of manufacturing IC of claim 20 further comprising: repeating the first pull step; and dispatching from the second stage to the first one of the stages.

24. The dispatching method of wafers of manufacturing IC of claim 20, wherein the first stage is the last one of the stages.

25. The dispatching method of wafers of manufacturing IC of claim 17, wherein the second pull step further comprises: if a mount of lots of wafers manufactured in a first workstation of the workstation s is not filled to a second full load and has a second vacancy, dispatching a third lot of wafers having the same amount as the second vacancy of the first workstation to a second workstation, in front of the first workstation, wherein the first workstation and the second workstation are in the same stage, and the third lot of wafers comprises included in the lots of wafers.

26. The dispatching method of wafers of manufacturing IC of claim 17, wherein the third lot of wafers has the same amount of the second vacancy.

27. The dispatching method of wafers of manufacturing IC of claim 17, wherein the second workstation is next to the first workstation.

28. The dispatching method of wafers of manufacturing IC of claim 17 further comprising: repeating the second pull step and dispatching from the second workstation of the stages to the first one of the workstation of the stages.

29. The dispatching method of wafers of manufacturing IC of claim 17, wherein the second pull step further comprises: dispatching the lots of wafers into the workstations, which are not filled with the second full load.

* * * * *